Figure 1:
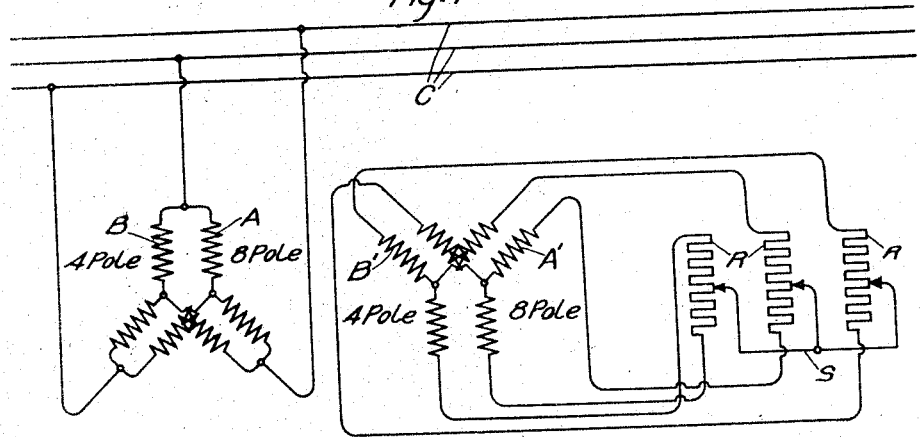

No. 882,606.

PATENTED MAR. 24, 1908.

E. F. W. ALEXANDERSON.
INDUCTION MOTOR CONTROL.
APPLICATION FILED MAR. 7, 1906.

Witnesses:
Murray D Badgley
Helen Axford

Inventor
Ernst F. W. Alexanderson
By Albert G. Davis
Att'y

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

INDUCTION-MOTOR CONTROL.

No. 882,606.

Specification of Letters Patent.

Patented March 24, 1908.

Application filed March 7, 1906. Serial No. 304,650.

*To all whom it may concern:*

Be it known that I, ERNST F. W. ALEXANDERSON, a subject of the King of Sweden, residing at Schenectady, in the county of Schenectady and State of New York, have invented certain new and useful Improvements in Induction-Motor Control, of which the following is a specification.

My invention relates to the control of induction motors, and its object is to provide a novel method of, and means for, controlling such motors, whereby they may be operated efficiently at different speeds and their speeds increased step-by-step in as simple a manner as is possible with a direct-current motor. It has been proposed heretofore so to arrange induction motors as to adapt them for connection for different pole numbers, thereby obtaining a plurality of different speeds. This has been accomplished both by varying the connections of a single winding and by providing the motor with a plurality of separate windings of different pole numbers. If the secondary member is coil-wound, and not of the squirrel-cage type, both primary and secondary must be arranged for connection for either speed. Such an arrangement gives a plurality of fixed speeds, but not means for shifting gradually the speed at which the motor tends to run at no load.

My invention relates to motors having both primary and secondary members adapted for connection for different pole numbers, and consists in supplying current to both sets of connections simultaneously and varying the relative impedance of the circuits formed by the two sets of secondary connections. By supplying current to both sets of primary connections simultaneously, a speed is produced somewhere between the two speeds corresponding to the two different pole numbers. The current in the connections for the smaller number of poles attempts to pull the motor up to the higher of the two limiting speeds, but when the speed corresponding to synchronism for the greater number of poles is passed, the current in that set of connections exerts a negative torque,— or in other words, produces a generator action which tends to return current to the line. The resultant torque is the difference between the positive torque produced by the current in the connections corresponding to the smaller number of poles and the negative torque produced in the other set of connections. By varying the relative impedances of the two secondary circuits, these torques may be varied relatively to each other, so that consequently the speed of the motor for a given torque may be varied and may be made to assume any desired value between the two limiting speeds.

My invention further comprises certain arrangements of controlling means adapted for the convenient practice of the control above described.

Figure 2:
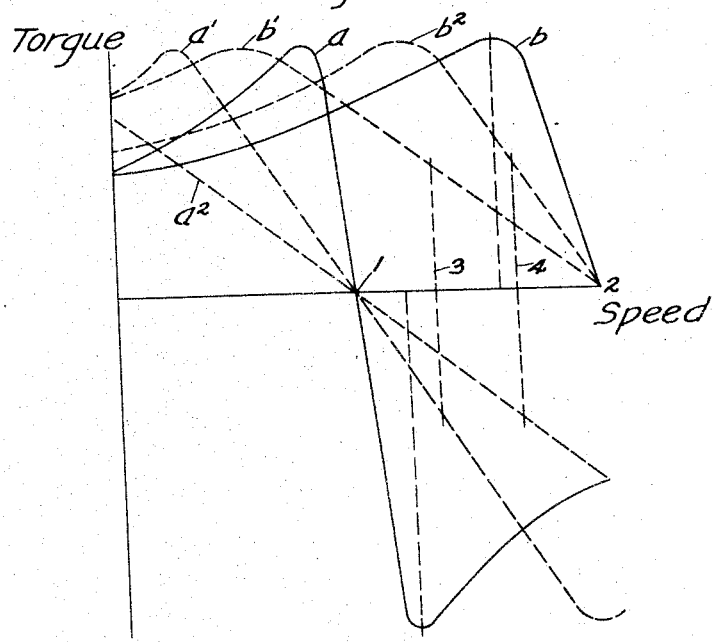

My invention will best be understood by reference to the accompanying drawings, in which Figure 1 shows diagrammatically an induction motor arranged for control in accordance with my invention; and Fig. 2 is an explanatory diagram.

Referring first to Fig. 2, the curves $a$ and $b$ represent speed-torque characteristics of a motor connected for two different pole numbers. The ratio of the two pole numbers for the curves shown in this figure is 2 to 1, and the figure may be considered for example as representing the curves of a motor connected for eight poles and four poles, respectively. The curve $a$ is shown continued beyond the point 1 representing synchronous speed, beyond which point the torque becomes negative, indicating the well-known generator action above synchronism. If only one set of connection is operative, the speed-torque characteristic of the motor is represented by the corresponding curve $a$ or $b$, with the limiting speeds,—that is, the points of zero torque, at 1 and 2, respectively. Now, if it is desired to obtain speeds between 1 and 2, this can be accomplished by connecting the motor for both pole numbers at the same time and varying the relative impedances in the secondary circuits. It is well understood in the art that inserting a non-inductive resistance in the circuit of an induction motor modifies the speed-torque characteristic by decreasing the slope,—or in other words, shifting the point of maximum torque back to a lower speed. Thus, for instance, assume that voltage is being supplied to both sets of primary connections and that sufficient resistances are included in the two secondary circuits so as to modify the speed-torque characteristics for the two pole numbers, as represented by the curve $a'$ and $b'$. If these two curves are considered, it will be seen that the points where the two curves are intersected by the vertical line 3 are equidistant from the speed axis. In other words, the positive torque at this speed, due to the current in the four-pole connections, is equal to the negative torque due to the current in the eight-pole connections. Consequently, with these resistances in the two secondary circuits, the motor reaches its limiting speed, or point of zero torque, where the line 3 cuts the speed axis. Now, if the resistance in the eight-pole secondary circuit be increased so as to make the speed-torque characteristic as indicated by the curve $a^2$, while at the same time the resistance in the four-pole secondary circuit is decreased so as to make the speed torque characteristic as indicated by the curve $b^2$, then the speed at which the positive and negative torques are equal is that indicated by the vertical line 4; so that the point where this line cuts the speed axis becomes the limiting speed, or point of zero torque. Obviously, by further varying the relative values of the resistances in the two secondary circuits, as many other speeds as desired intermediate the points 1 and 2 may be obtained. Further, it will be seen that although at the intermediate speeds some energy is being wasted in the resistances of the secondary circuits, at the two limiting speeds, that is, when either secondary circuit is short-circuited, the motor operates with normal efficiency.

In view of the above explanation, the connections, as shown in Fig. 1, will be readily understood.

A and B represent two primary windings connected for eight poles and four poles, respectively. The particular arrangement of these windings for obtaining these pole numbers forms no part of my invention, and will be readily understood by those skilled in the art. Furthermore, although I have indicated two distinct windings for obtaining the two pole numbers, this arrangement is not essential to my invention in its broader aspect. The two primary windings are shown connected in parallel to the source of three-phase current indicated by the line-wires C.

A' and B' represent the secondary windings of the motor, which are also respectively arranged for eight poles and four poles.

R R represent resistances, each of which has its opposite terminals connected to the two secondary windings respectively. A short-circuiting switch member S is arranged to connect successively different points of each resistance to corresponding points on the other resistances. With the switch member in an intermediate position, as shown, the four-pole secondary winding B' is connected in Y in closed circuit with the upper portions of the resistances, while the eight-pole winding is similarly connected with the lower portions of the resistances in circuit. As the switch member S is moved up or down, the resistance in circuit with each secondary winding is simultaneously and oppositely varied. With the switch member in either extreme position, one of the secondary windings is short-circuited on itself, while the other has all the resistances in circuit with it.

Although I have shown and described a motor arranged for only two pole-numbers, it will be understood that my invention is not limited to this particular application, but may be used to secure gradual variations from one speed to another in a motor arranged for connection for any number of poles.

I do not desire to limit myself to the particular construction and arrangement of parts here shown, but aim in the appended claims to cover all modifications which are within the scope of my invention.

I do not claim broadly the method of operating an induction motor at varying speeds, consisting in establishing two sets of connections adapted to produce operation at two different speeds, supplying current to both sets of connections simultaneously, and varying the relative torque produced thereby, since I believe that K. A. Pauly is entitled to priority of invention on the said method, thus broadly stated

What I claim as new and desire to secure by Letters Patent of the United States, is:

1. The method of controlling an induction motor having both primary and secondary members adapted for connection for different pole numbers, which consists in supplying current to both sets of primary connections simultaneously, and varying the relative impedances of the circuits formed by the two sets of secondary connections.

2. The method of controlling an induction motor having both primary and secondary members adapted for connection for different pole numbers, which consists in supplying current to both sets of primary connections simultaneously, and varying simultaneously and oppositely the impedances of the circuits formed by the two sets of secondary connections.

3. The method of operating at varying speeds an induction motor having two windings of different pole numbers on both primary and secondary members, which consists in supplying current to both primary windings and varying the relative impedances of the circuits of the secondary windings.

4. The method of operating at varying speeds an induction motor having two windings of different pole numbers on both primary and secondary members, which consists in supplying current to both primary windings and varying simultaneously and oppositely the impedances of the circuits of the secondary windings.

5. In combination, an induction motor having both primary and secondary members adapted for connection for different pole numbers, means for supplying current to both sets of primary connections simultaneously, and means for varying the relative impedances of the circuits formed by the two sets of secondary connections.

6. In combination, an induction motor having both primary and secondary members adapted for connection for different pole numbers, means for supplying current to both sets of primary connections simultaneously, and means for varying simultaneously and oppositely the impedances of the circuits formed by the two sets of secondary connections.

7. In combination, an induction motor having two sets of primary and secondary windings of different pole numbers, means for supplying current to both primary windings simultaneously, and means for varying the relative impedances in the circuits of the two secondary windings.

8. In combination, an induction motor having two sets of primary and secondary windings of different pole numbers, means for supplying current to both primary windings simultaneously, and switching means in circuit with both secondary windings arranged to vary the relative impedances in the circuits of said windings.

9. In combination, an induction motor having two sets of primary and secondary windings of different pole numbers, means for supplying current to both primary windings simultaneously, and switching means in circuit with both secondary windings arranged to vary simultaneously and oppositely the impedances of the circuits of said windings.

10. In combination, an induction motor having two sets of primary and secondary windings of different pole numbers, means for supplying current to both primary windings simultaneously, a non-inductive resistance, and means for inserting variable portions of said resistance in circuit with either secondary winding.

11. In combination, an induction motor having two sets of primary and secondary polyphase windings of different pole numbers, means for supplying current to both primary windings, a plurality of resistances, connections from opposite terminals of each resistance to the two secondary windings respectively, and a short-circuiting switching member arranged to connect successively different points on each resistance to corresponding points on the other resistances.

In witness whereof, I have hereunto set my hand this 6th day of March, 1906.

ERNST F. W. ALEXANDERSON.

Witnesses:
BENJAMIN B. HULL,
HELEN ORFORD.